No. 12,324. REISSUED MAR. 14, 1905.
J. L. SULLIVAN.
TROLLEY WHEEL GUARD FOR ELECTRIC WIRES.
APPLICATION FILED JAN. 26, 1905.
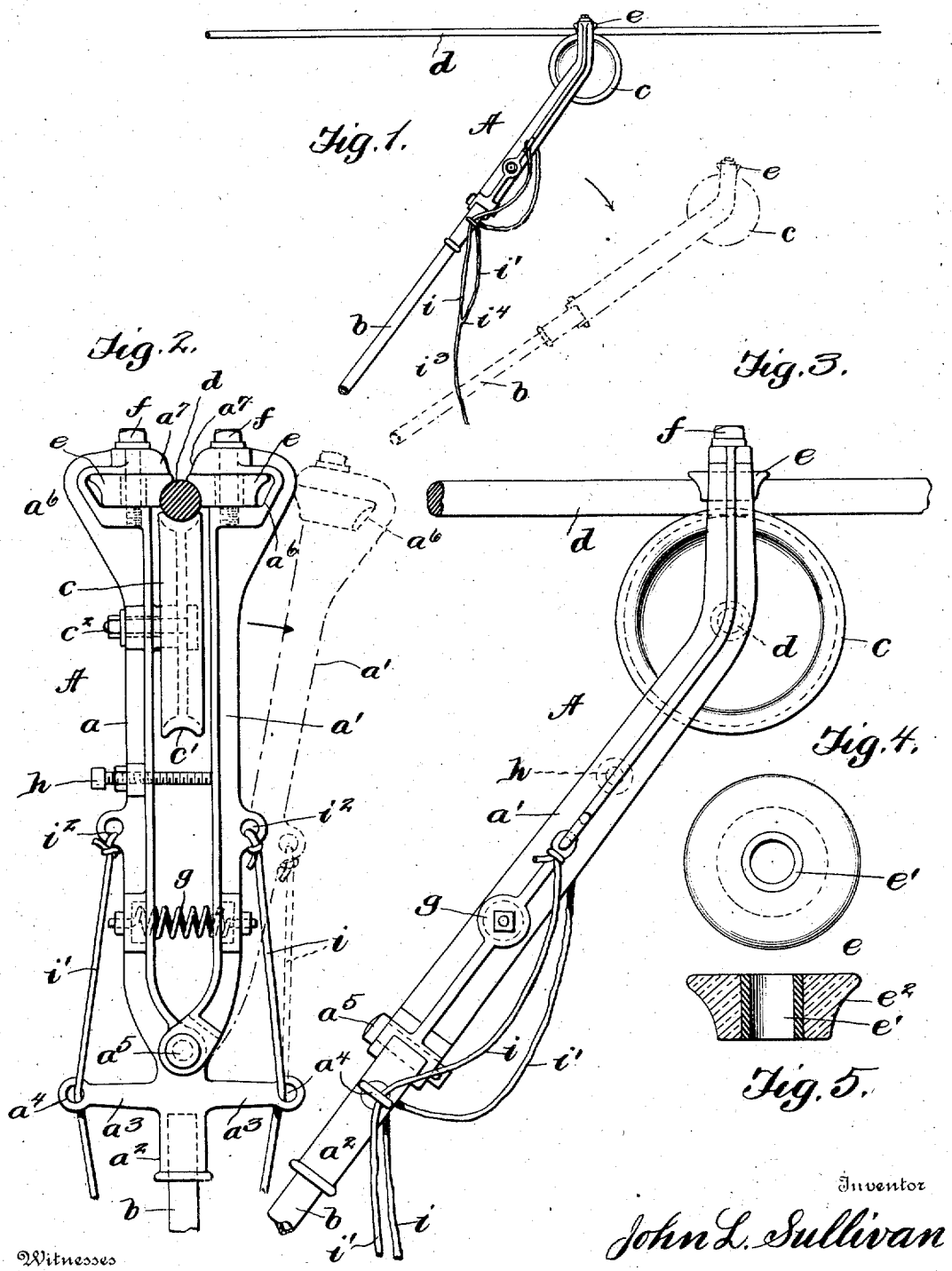
Witnesses
Robert A. Boswell.
William E. Brown
Inventor
John L. Sullivan
By Horatio E. Bellows
Attorney
PHOTO-LITHOGRAPHED BY SACKETT & WILHELMS LITHO. & PTG. CO. NEW YORK.

No. 12,324. Reissued March 14, 1905.

UNITED STATES PATENT OFFICE.

JOHN L. SULLIVAN, OF WARREN, RHODE ISLAND, ASSIGNOR OF ONE-HALF TO JOSEPH HARRIS, OF WARREN, RHODE ISLAND.

TROLLEY-WHEEL GUARD FOR ELECTRIC WIRES.

SPECIFICATION forming part of Reissued Letters Patent No. 12,324, dated March 14, 1905.

Original No. 777,049, dated December 6, 1904. Application for reissue filed January 26, 1905. Serial No. 242,816.

*To all whom it may concern:*

Be it known that I, JOHN L. SULLIVAN, a citizen of the United States, residing at the town of Warren, in the county of Bristol and State of Rhode Island, have invented certain new and useful Improvements in Trolley-Wheel Guards for Electric Wires, of which the following is a specification.

This invention relates to improvements on the guard for a trolley-wheel which is mounted on the pole or shaft of electric cars; and the object of my invention is to provide means for preventing accidental displacement of the trolley-wheel from contact with the overhead electric wire and at the same time having means whereby the wheel-guard may be readily withdrawn from or acted upon to permit of engagement with said wire.

The invention consists of the novel construction and combination of parts, as hereinafter described, and specifically set forth in the claims.

In the accompanying sheet of drawings, Figure 1 represents a side elevation of a trolley-wheel guard as mounted on the swinging pole or shaft of an electric car and in contact with the electric wire and also showing in dotted lines one position the wheel-guard assumes when free of the wire. Fig. 2 is an enlarged front elevation view of the wheel-guard, showing the relative position of parts embodying my improvements, as when the wheel-guard is in engagement with the wire, and also showing in dotted lines the other position the wheel-guard assumes when free of the wire. Fig. 3 is a side elevation of Fig. 1, showing the normal position of the wheel-guard as in contact with the wire. Fig. 4 is a top plan view of one of the rollers for the wheel-guard, and Fig. 5 is a diametrical sectional view of said roller.

Like letters of reference indicate like parts.

Referring to Fig. 2, A designates my improved wheel-guard as a whole, having a frame comprising two arms $a$ and $a'$. The lower portion of the arm $a$ has a hub $a^2$, within which is rigidly secured the end of the ordinary pole or shaft $b$ of the electric car. The arm $a$ has two opposite integral extensions $a^3$ $a^3$ situated on its hub $a^2$ and provided each with an opening, as at $a^4$ $a^4$, for the passage of pull-cord connections, explained presently. The lower portion of the arm $a'$ is bifurcated to receive a pin connection $a^5$ with the hub of the arm $a$, and said arms $a$ and $a'$ have laterally-arranged U-shaped upper portions disposed opposite each other, as at $a^6$ $a^6$.

$c$ is the main trolley-wheel, which is provided with a shallow groove $c'$ in its periphery and forming a bearing-surface arranged to contact with the bottom portion of the trolley electric wire $d$. This wheel $c$ is situated between the aforesaid frame and pivotally mounted on a stud $c^2$ of its arm $a$, and said wheel is properly insulated upon the frame in any well-known manner to receive the current from the main wire $d$.

$e$ $e$ are two rollers situated in the upper U-shaped extremities of the arms $a$ and $a'$ and are pivotally mounted on bolts $f$ $f$, which are fixedly secured in a vertical position in this portion of the frame. These rollers $e$ $e$ are made of hardened material, such as rawhide, and have metallic bushings driven in centrally, as at $e'$ in Fig. 5, to take the wear when mounted on the bolts $f$ $f$, and said rollers are of this non-electric-conductor material in order to prevent the frame from being charged by the current at this portion thereof. Said rollers $e$ $e$ are provided with curved or grooved peripheral surfaces $e^2$ $e^2$, arranged to extend over and upon the sides of the electric wire $d$ in the manner shown in Fig. 2.

$g$ is a pull-spring whose ends are connected to the arms $a$ and $a'$, comprising the frame, and said pull-spring is adapted to hold the swinging arm $a'$ in its closed or normal position, whereby the rollers $e$ $e$ are brought in contact with the wire $d$.

$h$ is a set-screw mounted in a screw-threaded opening formed in the arm $a$, and said screw is arranged to have its inner end bear against the opposite swinging arm $a'$ and forming a stop to prevent the rollers $e$ $e$ from making too great a frictional contact upon the wire $d$.

One portion of this wheel-guard A has its frame extending parallel with the inclined pole or shaft $b$ of the car to the longitudinal center of the main trolley-wheel $c$, and from said trolley-wheel the frame projects vertically, so that the axial centers of its rollers $e$ $e$ are at a right angle to the longitudinal center of the wire $d$ in the manner shown in Figs. 1, 2, and 3.

$i$ $i'$ are two flexible cords of different lengths and arranged to move loosely in the openings of the extensions $a^3$ $a^3$ of the arms $a$ and $a'$. Said cords $i$ $i'$ have one of their ends connected in openings formed in the arms $a$ and $a'$, as at points $i^2$ $i^2$, and their opposite ends spliced together to the usual pull-cord $i^3$, as at a point $i^4$ in Fig. 1.

The operation of my device is as follows: When it is desired to remove the wheel-guard A from its normal position of contact with the electric wire $d$, the conductor or operator pulls upon the main cord $i^3$, and which movement causes the shorter cord connection $i$ to become taut first, so that the arm $a'$ is made to swing outward to the dotted position indicated in Fig. 2. By the time the arm $a'$ assumes the aforesaid position the longer cord connection $i'$ will next become taut, so that the arm $a$ is now made to swing rearward and free of the wire to the position indicated by broken lines in Fig. 1. The upper portion of the arms $a$ and $a'$ expose outwardly-inclined surfaces, as at $a^7$ $a^7$, to receive and allow the wire $d$ to find its normal position again between the rollers $e$ $e$.

By having two independent grooved rollers pivotally mounted over the main trolley-wheel and arranged to contact upon the side and upper portion of the wire $d$, so that the said wire is almost covered throughout its circle, it is obvious that by my construction and arrangement of parts this device is capable of holding its normal position when applied to the wire and at the same time free from any accidental displacement thereon.

Having described my improvements, what I claim, and desire to secure by Letters Patent, is—

1. A trolley-wheel guard comprising a frame having one relatively fixed and one relatively movable member, means carried by the free ends of said members for contacting with the electric wire, and a single means for first moving the movable member laterally as regards the said wire and then moving the frame bodily in line with and away from the said wire.

2. A trolley-wheel guard, comprising a frame having one relatively fixed member and a member movably mounted thereon, wire-contacting means carried by the free ends of said members, a pull-cord, and branches of different lengths extending from said pull-cord and connected one with each of said members, as and for the purpose specified.

3. A trolley-wheel guard, comprising a frame having a fixed and a movable member, wire-contacting means carried by the free ends of said members, adjusting means carried by one member for engagement with the other, and means for moving the movable member laterally with relation to and independent of the movement of the other member and then moving both members together at right angles to the said movement of the movable member.

4. A trolley-wheel guard comprising a frame having a movable member and a fixed member carrying wire-contacting means at their free ends, an adjusting device carried by the fixed member to engage the movable member, a spring interposed between the said members for normally holding the members in their closed position, and means for first moving the movable member at right angles to the length of the electric wire and then moving the two members together in a direction at substantially right angles to the said movement of the movable member.

5. A trolley-wheel guard, comprising a frame having a movable member and a relatively fixed member, wire-contacting means on said members near their free ends, a trolley-wheel mounted on the fixed member and between the same and the movable member, a set-screw mounted in one member for engagement with the other, means interposed between the said members for normally holding them in their closed position, and a pull-cord, and branches of different lengths for first moving the movable member away from the other member and then moving both members together in a direction at substantially right angles to the movement of the said movable member, as set forth.

6. In a trolley-wheel guard for electric wires, a frame having a member with means for securing it to the pole of an electric car, a wheel mounted on said member near its free end, a second member having one end pivotally connected with the first-named member, a wheel mounted on said member near its free end, means between said members for normally holding them closed, means for limiting the movement of said members toward each other, and a pull-cord having branches of different lengths, one of which is connected to the one member and the other to the other member, as and for the purpose set forth.

7. In a trolley-wheel guard for electric wires, the combination of a frame, comprising an arm having one end arranged to be secured to the swinging pole of an electric car and its opposite end terminating in a lateral U-shaped portion; a wheel pivotally mounted on said arm and provided with a groove in its peripheral surface to contact with the bottom of the electric wire; a second arm having one end pivotally connected on the first-mentioned arm and its opposite end terminating in a lateral U-shaped portion; rollers made of non-electric-conductor material and pivotally mounted in the U-shaped portions of said arms and provided with grooved peripheral surfaces arranged to contact upon the sides and upper portions of the electric wire; a pull-spring having its ends connected to said arms; a set-screw mounted in the first-mentioned arm and arranged to bear against the second-mentioned arm and forming a stop to prevent friction of said rollers upon the electric wire; and a pull-cord terminating with two branch cord connections, one of which cord connections is of a longer length and attached to the first-mentioned arm and the other of which cord connections is of shorter length and attached to the second-mentioned arm, substantially as set forth.

8. In a trolley-wheel guard for electric wires, the combination of a device, comprising a frame having two arms, one of which arms is arranged to be held in a fixed position upon the swinging pole of an electric car, and the other arm pivotally mounted on the fixed arm, and each of said arms having lateral U-shaped extremities disposed opposite each other; a grooved wheel pivotally mounted on the fixed arm of said frame and arranged to contact upon the bottom portion of the electric wire; grooved rollers made of non-conductor material and pivotally mounted in the U-shaped extremities of said frame and arranged to contact upon the side and upper portions of the electric wire; a pull-spring from the fixed arm of said frame to the pivotal arm thereof; means to permit adjustment of said arms of the said frame whereby its grooved rollers are brought into frictional contact with the electric wire; and a pull-cord having two integral cord connections of different lengths and having their ends attached to the arms of said frame, all arranged substantially as shown and for the purpose specified.

9. A trolley-wheel guard comprising an arm with hub to receive the end of the pole and lateral extensions, an arm pivotally mounted on said arm near its lower end, wire-contacting means carried by said arms near their free ends, a trolley-wheel carried by one of the said arms, means for adjustably limiting the approach of the said arms toward each other, means for normally holding the arms in their closed position, a pull-cord and branches of different lengths connected with the pull-cord and passed through openings in said extensions and connected with the arms between their ends.

In testimony whereof I affix my signature in the presence of two witnesses.

JOHN L. SULLIVAN.

Witnesses:
HORATIO E. BELLOWS,
WILLIAM E. BROWN.